United States Patent
Miyamoto et al.

(10) Patent No.: US 9,393,494 B2
(45) Date of Patent: Jul. 19, 2016

(54) INPUT DEVICE, COMPUTER-READABLE STORAGE MEDIUM HAVING INPUT PROCESSING PROGRAM STORED THEREIN, INPUT PROCESSING METHOD, AND INPUT PROCESSING SYSTEM

(75) Inventors: Takeshi Miyamoto, Kyoto (JP); Ichiro Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 782 days.

(21) Appl. No.: 13/288,243

(22) Filed: Nov. 3, 2011

(65) Prior Publication Data

US 2013/0066586 A1   Mar. 14, 2013

(30) Foreign Application Priority Data

Sep. 9, 2011   (JP) ................. 2011-197369

(51) Int. Cl.

| G01P 15/00 | (2006.01) |
|---|---|
| A63F 13/422 | (2014.01) |
| A63F 13/211 | (2014.01) |
| G06F 15/00 | (2006.01) |
| G06F 3/0346 | (2013.01) |
| A63F 13/20 | (2014.01) |
| G06F 1/16 | (2006.01) |
| A63F 13/92 | (2014.01) |

(52) U.S. Cl.
CPC .............. *A63F 13/422* (2014.09); *A63F 13/06* (2013.01); *A63F 13/211* (2014.09); *G06F 1/1694* (2013.01); *G06F 3/0346* (2013.01); *G06F 15/00* (2013.01); *A63F 13/92* (2014.09); *A63F 2300/105* (2013.01); *A63F 2300/204* (2013.01); *A63F 2300/6045* (2013.01); *A63F 2300/646* (2013.01)

(58) Field of Classification Search
CPC ........................................................ G06F 15/00
USPC ........................................................ 702/141
See application file for complete search history.

(56) References Cited

U.S. PATENT DOCUMENTS

| 8,072,424 | B2 * | 12/2011 | Liberty | ........................ 345/158 |
|---|---|---|---|---|
| 2008/0125223 | A1 * | 5/2008 | Ohta | .............................. 463/36 |
| 2009/0326846 | A1 | 12/2009 | Ohta | |
| 2010/0070132 | A1 * | 3/2010 | Doi | ................................ 701/36 |
| 2010/0304757 | A1 | 12/2010 | Yoshioka | |

(Continued)

FOREIGN PATENT DOCUMENTS

| JP | 6-190144 | 7/1994 |
|---|---|---|
| JP | 4265814 | 2/2009 |

(Continued)

OTHER PUBLICATIONS

English language translation of JP 4265814 (41 pages), 2010.

(Continued)

*Primary Examiner* — Sujoy Kundu
*Assistant Examiner* — Ricky Ngon
(74) *Attorney, Agent, or Firm* — Nixon & Vanderhye PC

(57) ABSTRACT

An exemplary input device detects a first detected attitude thereof based on angular velocity data outputted from an angular velocity sensor. Next, the input device corrects the first detected attitude based on acceleration data outputted from an acceleration sensor. Then, the input device performs predetermined information processing, without using components, in a horizontal direction and a depth direction, of the first detected attitude which has been corrected.

23 Claims, 8 Drawing Sheets

(56) References Cited

U.S. PATENT DOCUMENTS

| | | | |
|---|---|---|---|
| 2011/0105957 A1* | 5/2011 | Kourogi et al. | 600/595 |
| 2011/0199298 A1* | 8/2011 | Bassompiere et al. | 345/157 |
| 2012/0113228 A1 | 5/2012 | Konno et al. | |

FOREIGN PATENT DOCUMENTS

| | | |
|---|---|---|
| JP | 2009163538 | 7/2009 |
| JP | 4628483 | 11/2010 |
| JP | 4696184 | 3/2011 |

OTHER PUBLICATIONS

English language translation of JP 4628483 (35 pages), 2009.

English-language Abstract and translation of JP2009-163538 (16 pages), 2009.

English language translation of JP 4696184 (102 pages), 2012.

* cited by examiner

INPUT DEVICE, COMPUTER-READABLE STORAGE MEDIUM HAVING INPUT PROCESSING PROGRAM STORED THEREIN, INPUT PROCESSING METHOD, AND INPUT PROCESSING SYSTEM

CROSS REFERENCE TO RELATED APPLICATION

The disclosure of Japanese Patent Application No. 2011-197369, filed on Sep. 9, 2011, is incorporated herein by reference.

FIELD

The exemplary embodiments described herein relate to an input device, a computer-readable storage medium having an input processing program stored therein, an input processing method, and an input processing system. In particular, the exemplary embodiments relate to an input device configured to detect an attitude thereof and execute predetermined processing, a computer-readable storage medium having an input processing program stored therein, an input processing method, and an input processing system.

BACKGROUND AND SUMMARY

Game apparatuses in which a game operation can be performed by tilting a controller are conventionally known. For example, a controller including a three-axis acceleration sensor therein is known, and a tilt angle of the controller is calculated by means of the acceleration sensor. Further, there is also known a technology for associating, in a driving game for which the above controller is used, the tilt angle of the controller with a steering angle of a steering wheel of a car appearing in the game.

However, if a controller as described above which includes an acceleration sensor therein is vigorously moved, since not only the gravitational acceleration but also many other components are contained in an acceleration vector detected by the acceleration sensor, there is a possibility that error is included in a calculated tilt angle (attitude) of the controller. In other words, when the acceleration sensor is in a static state, the attitude can be accurately determined based on an acceleration, whereas when the acceleration sensor is in motion, the attitude is erroneously determined.

In view of the above, a method of detecting an attitude of the controller or the like by means of an angular velocity sensor is conceivable. However, in the case of attitude calculation based on an angular velocity, error accumulates over time.

Therefore, an object of the exemplary embodiments is to provide an input device and an input processing method that enable accurate detection of an attitude of the input device by utilizing the characteristics of an acceleration sensor and an angular velocity sensor.

The exemplary embodiments have the following features to attain the object mentioned above.

An input device according to the exemplary embodiments is an input device equipped with an angular velocity sensor and an acceleration sensor, and the input device includes a first attitude detection section, an attitude correction section, and a processing section. The first attitude detection section detects a first detected attitude of the input device, based on angular velocity data outputted from the angular velocity sensor. The attitude correction section corrects the first detected attitude, based on acceleration data outputted from the acceleration sensor. The processing section executes predetermined information processing, without using components, in a horizontal direction and a depth direction, of the first detected attitude corrected by the attitude correction section. Here, the depth direction means a direction of an axis which is perpendicular to both a vertical direction and the horizontal direction in a three-dimensional space.

According to the above configuration, when an operation of changing the attitude of the input device is performed in such a manner as to cause a change of the attitude along the gravity direction, it is possible to execute information processing in which the change of the attitude is accurately reflected.

In another configuration example, the attitude correction section may define an attitude of the input device in a static state as a second detected attitude, based on an acceleration indicated by the acceleration data, and may correct the first detected attitude in such a manner that the first detected attitude approximates to the second detected attitude. Here, the attitude of the input device in a static state can be referred to as an attitude of the input device when the gravity direction is assumed to be a vertically-downward direction.

According to the above configuration, a current attitude of the input device can be accurately determined.

In another configuration example, the attitude correction section may define, as the second detected attitude, an attitude of the input device when a direction of the acceleration indicated by the acceleration data is substantially a vertically-downward direction.

According to the above configuration, it is possible to perform correction utilizing the gravity direction which is an absolute reference, and thus possible to perform correction with high reliability with respect to a change of the attitude in the gravity direction.

In still another configuration example, the attitude correction section may perform correction to make the first detected attitude approximate to the second detected attitude in such a manner that the more approximate a magnitude of the acceleration is to a magnitude of the gravitational acceleration, the more approximate the first detected attitude is to the second detected attitude.

According to the above configuration, the more approximate the magnitude of the acceleration detected by the acceleration sensor is to the magnitude of the gravitational acceleration, the more strongly the second detected attitude is reflected in the corrected attitude. It can be assumed that the more approximate the magnitude of the acceleration is to the magnitude of the gravitational acceleration, the more accurately the gravitational acceleration is indicated and the second detected attitude is determined. Accordingly, when the second detected attitude is accurately determined, the first detected attitude is corrected so as to be approximate to the second detected attitude, whereas when the second detected attitude is not determined with high accuracy, the first detected attitude is hardly corrected. Therefore, the corrected attitude can be accurately calculated.

In still another configuration example, the processing section may execute the predetermined processing, in accordance with a component, along the vertical direction, of a predetermined one of attitude vectors along three axes which represent the corrected first detected attitude.

According to the above configuration, in the case, for example, where a planar operation, such as an operation of a steering wheel of a car, is performed by moving the input device, a change of the attitude caused by the operation can be accurately reflected in the information processing.

In still another configuration example, the input device may include a display screen in an integrated manner, and the processing section may display a result of the predetermined information processing on the display screen.

According to the above configuration, in a situation where a user can easily recognize an error of tilt, such as a case where the display screen also tilts as the input device is tilted, it is possible to perform screen display that does not make the user feel the sense of incongruity with respect to a tilt recognized by the user.

An input processing program according to the exemplary embodiments is an input processing program executed by a computer of an information processing apparatus equipped with an angular velocity sensor and an acceleration sensor, and the input processing program causes the computer to function as a first attitude detection section, an attitude correction section, and a processing section. The first attitude detection section detects a first detected attitude of the input device, based on angular velocity data outputted from the angular velocity sensor. The attitude correction section corrects the first detected attitude, based on acceleration data outputted from the acceleration sensor. The processing section executes predetermined information processing, without using components, in a horizontal direction and a depth direction, of the first detected attitude corrected by the attitude correction section.

An input processing method according to the exemplary embodiments is an input processing method used in an information processing apparatus equipped with an angular velocity sensor and an acceleration sensor, and the input processing method includes the steps of: detecting a first detected attitude of the input device, based on angular velocity data outputted from the angular velocity sensor; correcting the first detected attitude, based on acceleration data outputted from the acceleration sensor; and executing predetermined information processing, without using components, in a horizontal direction and a depth direction, of the corrected first detected attitude.

An input processing system according to the exemplary embodiments is an input processing system equipped with an angular velocity sensor and an acceleration sensor, and the input processing system includes a first attitude detection section, an attitude correction section, and a processing section. The first attitude detection section detects a first detected attitude of the input device, based on angular velocity data outputted from the angular velocity sensor. The attitude correction section corrects the first detected attitude, based on acceleration data outputted from the acceleration sensor. The processing section executes predetermined information processing, without using components, in a horizontal direction and a depth direction, of the first detected attitude corrected by the attitude correction section.

According to the exemplary embodiments, when an operation of changing the attitude of the input device is performed in such a manner as to cause a change of the attitude along the gravity direction, it is possible to execute information processing in which the change of the attitude is accurately reflected.

DETAILED DESCRIPTION OF NON-LIMITING EXAMPLE EMBODIMENTS

Hereinafter, an exemplary embodiment will be described with reference to the drawings.

Figure 1:
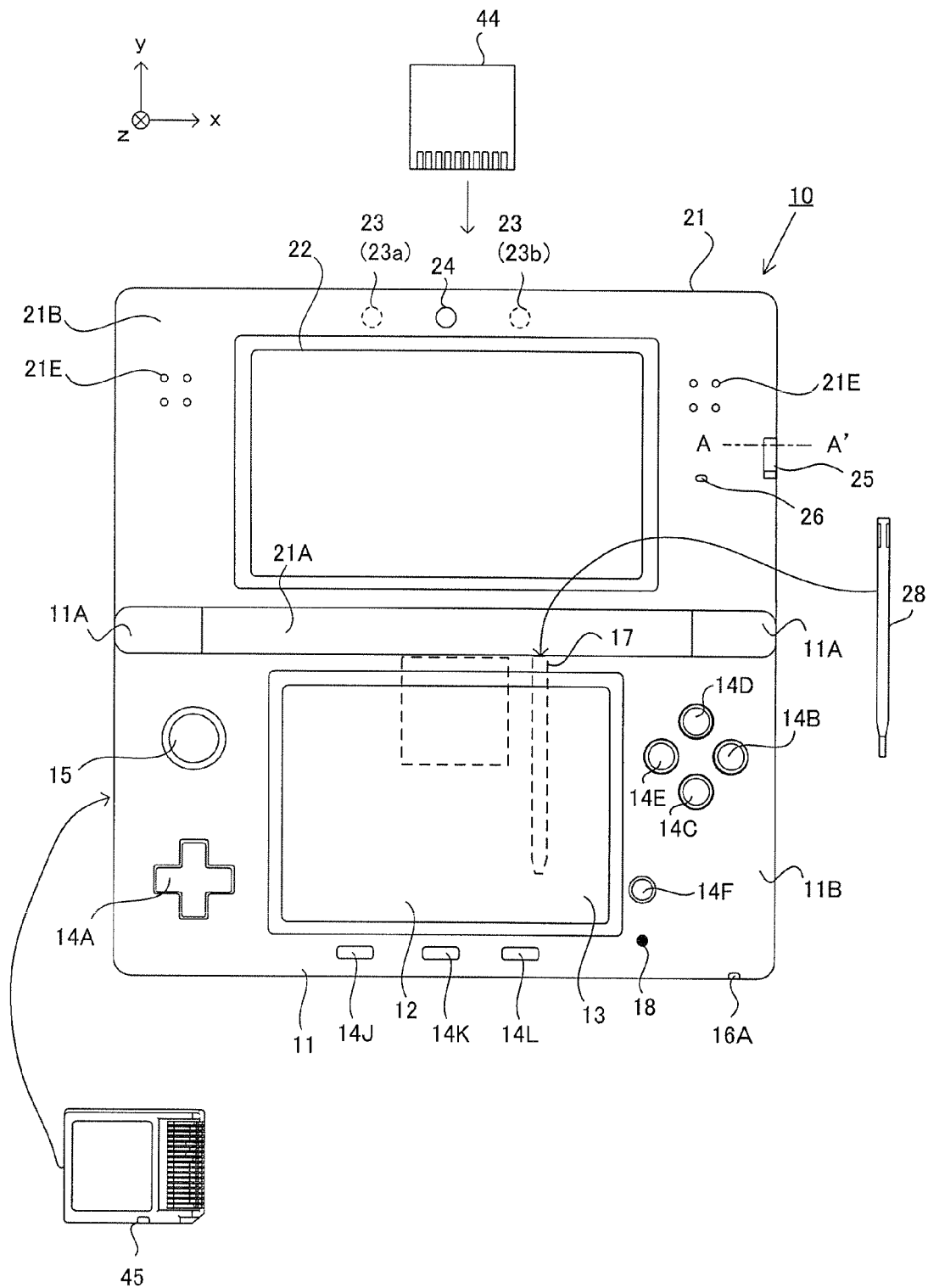
FIG. 1 is a front view of a game apparatus 10 in an opened state.

FIG. 1 shows a game apparatus 10 which is a foldable hand-held game apparatus in an opened state. The game apparatus 10 is formed in a size that allows the user to hold it with their one or both hands even when the game apparatus 10 is in the opened state The game apparatus 10 includes a lower housing 11 and an upper housing 21. The lower housing 11 and the upper housing 21 are connected to each other so as to be openable and closable (foldable). In the example of FIG. 1, the lower housing 11 and the upper housing 21 are each formed in a horizontal long plate-like rectangular shape, and are connected to each other at long side portions thereof so as to be pivotable with respect to each other. Normally, the user uses the game apparatus 10 in the opened state. When not using the game apparatus 10, the user keeps the game apparatus 10 in the closed state.

In the lower housing 11, a lower LCD (Liquid Crystal Display) 12 is provided. The lower LCD 12 has a horizontally long shape, and is located such that a long side direction thereof corresponds to a long side direction of the lower housing 11. Although an LCD is used as a display device to be incorporated in the game apparatus 10 in the exemplary embodiment, any other display device, such as a display device using an EL (Electro Luminescence), may be used, for example. In the game apparatus 10, a display device having any resolution may be used.

In the lower housing 11, operation buttons 14A to 14L and a touch panel 13 are provided as input devices. The operation buttons 14A to 14L are each an input device for making a predetermined input. As shown in FIG. 1, among the operation buttons 14A to 14L, the cross button 14A (the direction input button 14A), the button 14B, the button 14C, the button 14D, the button 14E, the power button 14F, the selection button 14J, the HOME button 14K, and the start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

An analog stick 15 is a device for indicating a direction, and is provided to the left of the lower LCD 12 in an upper portion of the inner side surface of the lower housing 11. As the analog stick 15, a component which enables an analog input by being tilted by a predetermined amount, in any direction, such as the upward, the downward, the rightward, the leftward, or the diagonal direction, may be used.

The button 14B, the button 14C, the button 14D, and the button 14E, which are positioned so as to form a cross shape, are positioned such that a thumb of a right hand with which the lower housing 11 is held is naturally positioned on the positions of the four buttons. Further, these four buttons and the analog stick 15 are on opposite sides of the lower LCD 12, so as to be symmetrical in position with respect to each other. Thus, depending on a game program, for example, a left-handed user can make a direction instruction input by using these four buttons.

Further, a microphone hole 18 is provided on the inner side surface of the lower housing 11. Under the microphone hole 18, a microphone is provided as a sound input device described below, and the microphone detects for a sound from the outside of the game apparatus 10.

In FIG. 1, the operation buttons 14G to 14I are omitted. For example, the L button 14G is provided on the left end portion of the upper side surface of the lower housing 11, and the R button 14H is provided on the right end portion of the upper side surface of the lower housing 11. The L button 14G and the R button 14H are used, for example, for performing an imaging instruction operation (shutter operation) on the game apparatus 10. In addition, the sound volume button 14I is provided on the left side surface of the lower housing 11. The sound volume button 14I is used for adjusting a sound volume of a speaker of the game apparatus 10.

The game apparatus 10 further includes the touch panel 13 as another input device in addition to the operation buttons 14A to 14K. The touch panel 13 is mounted on the screen of the lower LCD 12. In the exemplary embodiment, the touch panel 13 may be, but not limited to, a resistive film type touch panel. Any press-type touch panel may be used. Further, in the exemplary embodiment, the touch panel 13 has the same resolution (detection accuracy) as that of, for example, the lower LCD 12. However, the resolution of the touch panel 13 and the resolution of the lower LCD 12 may not necessarily be the same. Further, an insertion opening 17 (indicated by a dashed line in FIG. 1) is provided on the upper side surface of the lower housing 11. The insertion opening 17 is used for accommodating a touch pen 28 which is used for performing an operation on the touch panel 13. Although an input on the touch panel 13 is usually made using the touch pen 28, a finger of a user may be used for making an input on the touch panel 13, in addition to the touch pen 28.

Further, a cover section 11C (not shown) is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, an insertion opening 11D (not shown) through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, a first LED 16A for notifying a user of an ON/OFF state of a power supply of the game apparatus 10 is provided on the lower side surface of the lower housing 11, and a second LED 16B (not shown) for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11b/g standard. A wireless switch 19 (not shown) for enabling/disabling the function of the wireless communication is provided on the right side surface of the lower housing 11.

Further, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. The upper LCD 22 has a horizontally long shape, and is located such that a long side direction thereof corresponds to a long side direction of the upper housing 21. The upper LCD 22 is positioned at the center of the upper housing 21. The area of the screen of the upper LCD 22 is set so as to be greater than the area of the screen of the lower LCD 12. Further, the screen of the upper LCD 22 is horizontally elongated as compared to the screen of the lower LCD 12. A touch panel may be provided so as to cover the upper LCD 22.

The screen of the upper LCD 22 is provided on the inner side surface (main surface) 21B of the upper housing 21, and the screen of the upper LCD 22 is exposed at an opening of the upper housing 21. The number of pixels of the upper LCD 22 may be, for example, 640 dots×200 dots (the horizontal line× the vertical line). Although, in the exemplary embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. In the exemplary embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the exemplary embodiment, the upper LCD 22 of a parallax barrier type is used. Further, the upper LCD 22 may disable the parallax barrier. When the parallax barrier is disabled, an image can be displayed in a planar manner. Thus, the upper LCD 22 is a display device capable of switching between a stereoscopic display mode for displaying a stereoscopically visible image and a planar display mode for displaying an image in a planar manner (for displaying a planar visible image). The switching of the display mode is performed by the 3D adjustment switch 25 which is a slide switch.

Two imaging sections (23a and 23b) provided on the outer side surface (the back surface reverse of the main surface on which the upper LCD 22 is provided) 21D of the upper housing 21 are generically referred to as the outer imaging section 23. The outer imaging section (left) 23a and the outer imaging section (right) 23b are positioned to the left and right, respectively, of the upper LCD 22 (the upper housing 21) so as to be horizontally symmetrical with respect to the center of the upper LCD 22.

The inner imaging section 24 is provided on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled.

Further, a speaker hole 21E is provided on the inner side surface of the upper housing 21. A sound is outputted through the speaker hole 21E from a speaker 43 described below.

(Internal Configuration of Game Apparatus 10)

Figure 2:
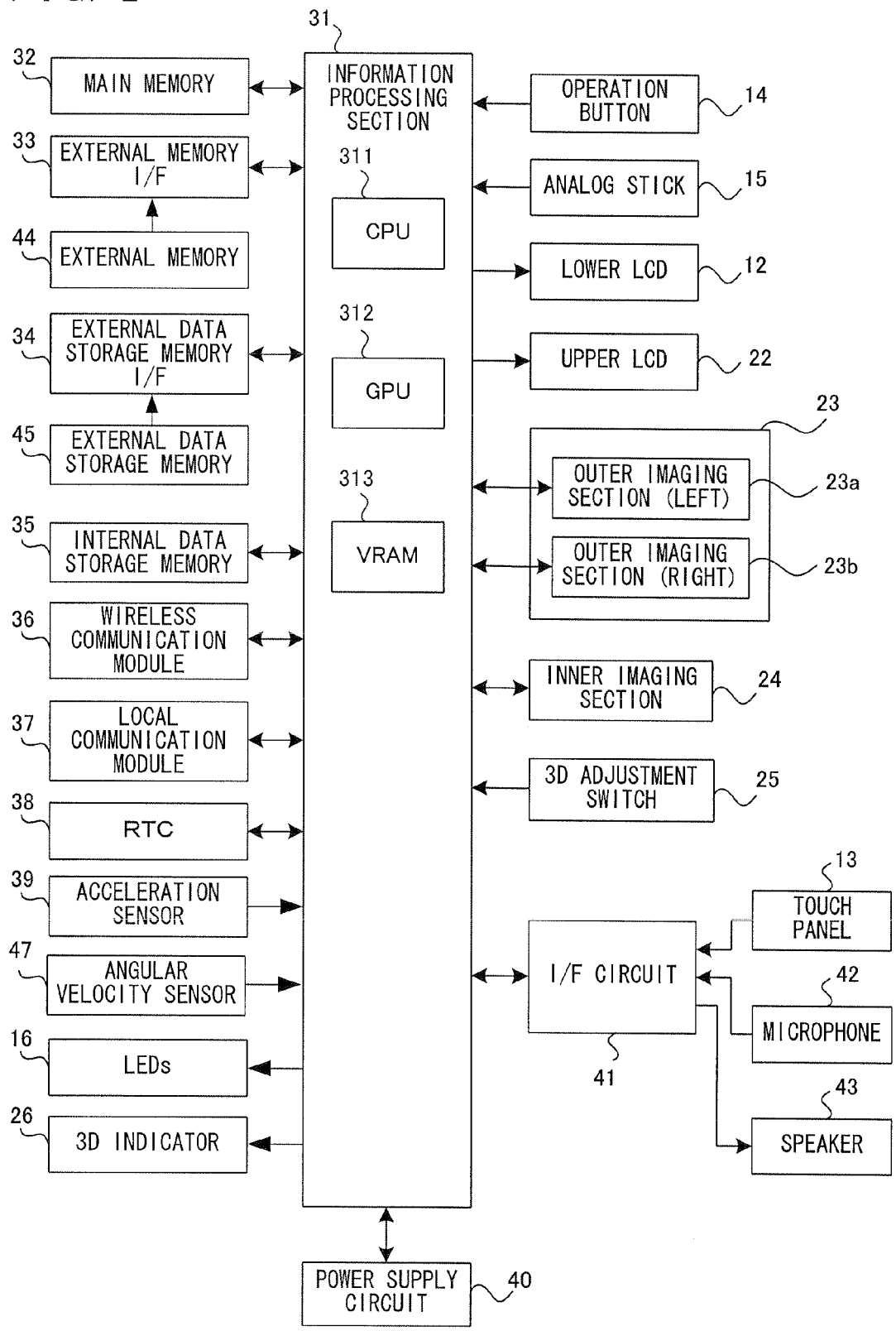
FIG. 2 is a block diagram showing an internal configuration of the game apparatus 10.

Next, an internal electrical configuration of the game apparatus 10 will be described with reference to FIG. 2. FIG. 2 is a block diagram showing an internal configuration of the game apparatus 10. As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, and an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. By executing a program stored in a memory (for example, the external memory 44 connected to the external memory I/F 33 or the internal data storage memory 35) inside the game apparatus 10, the CPU 311 of the information processing section 31 executes a process according to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. Then, the GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the above program, and temporarily stores a program acquired from the outside (the external memory 44, another device, or the like), for example. In the exemplary embodiment, for example, a PSRAM (Pseudo-SRAM) is used as the main memory 32.

The external memory 44 is non-volatile storage means for storing a program executed by the information processing section 31. The external data storage memory 45 is implemented as a non-volatile readable and writable memory (for example, a NAND flash memory), and is used for storing predetermined data.

The internal data storage memory 35 is implemented as a non-volatile readable and writable memory (for example, a NAND flash memory), and is used for storing predetermined data.

The wireless communication module 36 has a function of connecting to a wireless LAN by using a method based on, for example, IEEE 802.11b/g standard. The local communication module 37 has a function of performing wireless communication with the same type of game apparatus by using a predetermined communication method (for example, communication based on a proprietary protocol or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 and an angular velocity sensor 47 are connected to the information processing section 31. The acceleration sensor 39 detects magnitudes of accelerations (linear accelerations) in the directions of the straight lines along the directions of three axes (X-axis, Y-axis, and Z-axis). The acceleration sensor 39 is provided inside the lower housing 11.

The angular velocity sensor 47 detects angular velocities with respect to the three axes (X-axis, Y-axis, and Z axis). For example, the angular velocity sensor 47 is a gyro sensor composed of a chip of gyro sensor for three axes. The angular velocity sensor detects an angular velocity (per unit time) with respect to a yaw angle (an angular velocity around the Y axis), an angular velocity (per unit time) with respect to a roll angle (an angular velocity around the Z-axis), and an angular velocity (per unit time) with respect to a pitch angle (an angular velocity around the X-axis).

In the exemplary embodiment, in order to facilitate the calculation in the game process described below, the three axes with respect to which the angular velocity sensor 47 detects angular velocities are set to be the same as the three axes (X-axis, Y-axis, and Z-axis) with respect to which the acceleration sensor 39 detects accelerations.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (a rechargeable battery accommodated in the lower housing 11) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch coordinate data based on a signal outputted from the touch panel 13, and outputs the touch coordinate data to the information processing section 31. The touch coordinate data represents a coordinate of a position, on an input surface of the touch panel 13, on which an input is made. The touch panel control circuit reads a signal outputted from the touch panel 13, and generates the touch coordinate data every predetermined time. The information processing section 31 acquires the touch coordinate data, to recognize a position on which an input is made on the touch panel 13.

The operation button 14 includes the operation buttons 14A to 14L described above, and is connected to the information processing section 31. Operation data indicating an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 causes the upper LCD 12 to display a stereoscopic image (stereoscopically visible image).

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Figure 3:
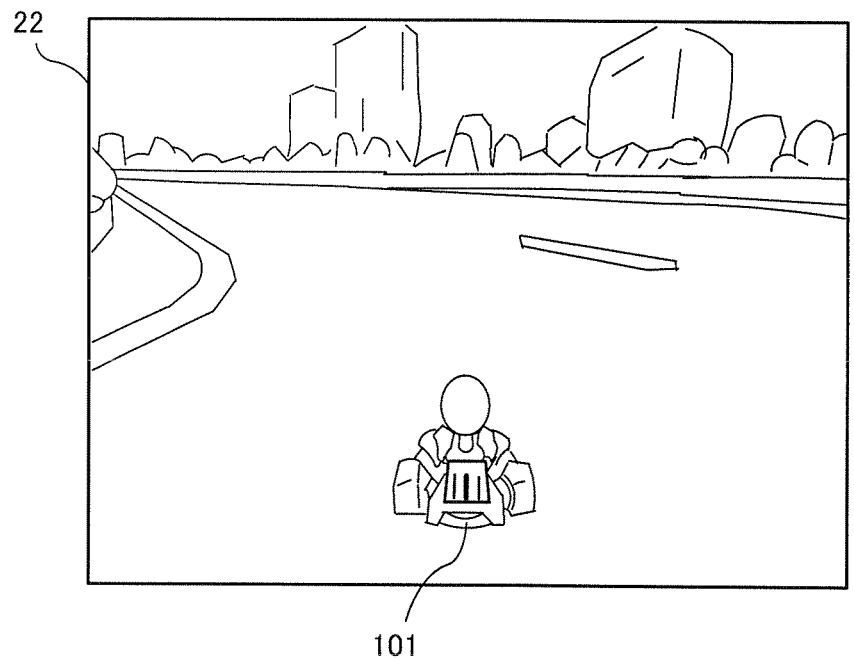
FIG. 3 shows a non-limiting example of a game screen assumed in an exemplary embodiment.
Figure 4:
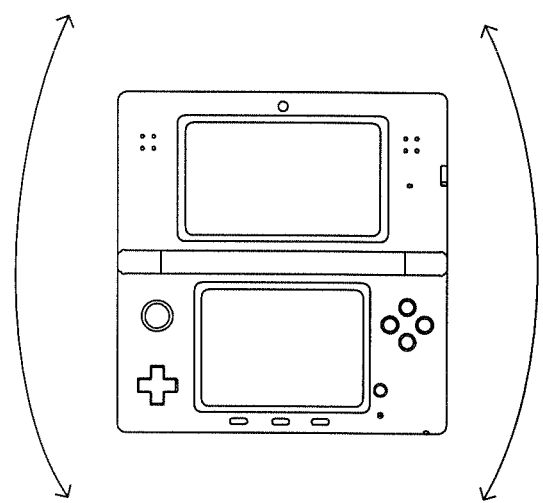
FIG. 4 shows a non-limiting example of an operation method assumed in an exemplary embodiment.

Next, an outline of a game process executed on the game apparatus 10 will be described. FIG. 3 shows an example of a game screen assumed in the exemplary embodiment. In FIG. 3, a player object 101 driving a racing car is displayed in the upper LCD 22. A player operates the player object 101 by operating the game apparatus 10 itself as if it is a steering wheel of the car. Specifically, the player holds the lower housing 11 with his/her both hands, and performs an operation of tilting the game apparatus 10 itself right or left as if to turn a steering wheel (see FIG. 4). With this operation, the attitude of the game apparatus 10 itself is changed. The attitude of the game apparatus 10 (to be accurate, this should be referred to as the attitude of the lower housing 11, but hereinafter, simply referred to as the attitude of the game apparatus 10) is reflected in a steering operation in the game process.

Next, an outline of an attitude detection process for detecting the attitude of the game apparatus 10 as described above will be described. In the exemplary embodiment, the game apparatus 10 obtains data (operation data) by means of the angular velocity sensor 47 and the acceleration sensor 39, and detects the attitude of the game apparatus 10. More specifically, the following process is performed in the exemplary embodiment. First, the attitude of the game apparatus 10 is detected based on angular velocities detected by the angular velocity sensor 47. Any method may be used as a method for detecting the attitude based on angular velocities. For example, there is a method in which angular velocities (per unit time) are successively added to an initial attitude. That is, angular velocities successively outputted from the angular velocity sensor 47 are integrated, and an amount of change in the attitude from the initial attitude is calculated from the result of the integration, whereby a current attitude of the game apparatus 10 can be detected. Hereinafter, the attitude of the game apparatus 10 detected based on angular velocities by using the attitude calculation method as described above is referred to as a "first detected attitude". In addition, an attitude obtained by correcting the first detected attitude is also referred to as the first detected attitude.

Here, the attitude of the game apparatus 10 including the first detected attitude can be represented as a 3×3 matrix M1 shown below.

[Formula 1]

$$M1 = \begin{bmatrix} X_x & Y_x & Z_x \\ X_y & Y_y & Z_y \\ X_z & Y_z & Z_z \end{bmatrix} \quad (1)$$

The attitude is represented as an attitude on the xyz-coordinate system (space coordinate system) which is based on a predetermined position in a space in which the game apparatus 10 is present. The columns represent vectors in X-axis direction, Y-axis direction, and Z-axis direction, respectively, on a coordinate system which is based on the game apparatus 10 itself, while the rows represent components along three axes, i.e., x-axis, y-axis, and z-axis, of the vectors. (That is, the space coordinate system is represented as the xyz-coordinate system, and a local coordinate system based on the game apparatus 10 is represented as the XYZ-coordinate system.) The vector in the X-axis direction corresponds to a vector in a direction (longitudinal direction) along the horizontal direction with respect to the game apparatus 10 shown in FIG. 1. The vector in the Y-axis direction corresponds to a vector in the vertical direction in FIG. 1. The vector in the Z-axis direction corresponds to a vector in the depth direction in FIG. 1.

Meanwhile, in the case where error is included in an output from an angular velocity sensor, the error is accumulated over time in a detected attitude. Accordingly, error in an output from the angular velocity sensor 47 may cause error between the first detected attitude calculated based on angular velocities detected by the angular velocity sensor 47, and an actual attitude of the game apparatus 10. Therefore, in the exemplary embodiment, the game apparatus 10 corrects the first detected attitude by using acceleration detected by the acceleration sensor 39. This is based on the following characteristics of the attitude detection using acceleration. That is, although the attitude detection using acceleration may cause a large error at one detection (when the game apparatus 10 is vigorously moved, for example), the error will not be accumulated since the attitude can be based on each detection.

Figure 5:
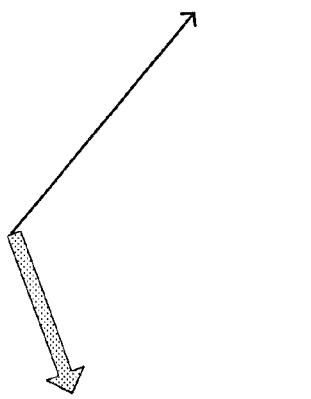
FIG. 5 illustrates the principle of attitude correction according to an exemplary embodiment.
Figure 6:
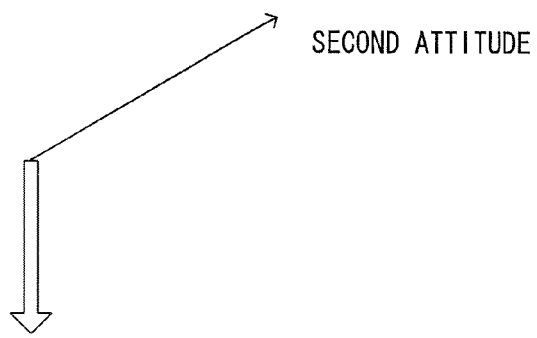
FIG. 6 illustrates the principle of attitude correction according to an exemplary embodiment.
Figure 7:
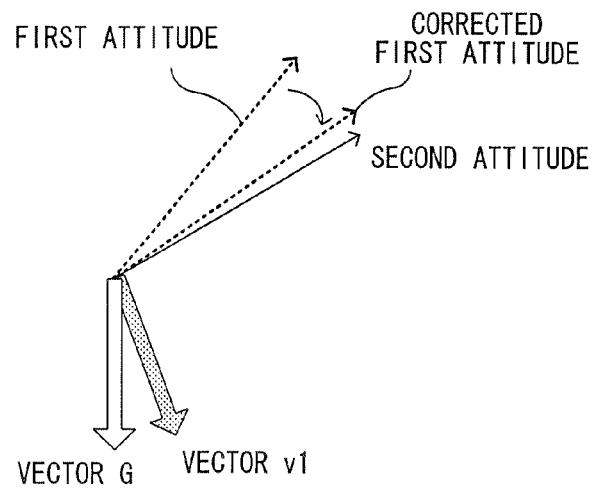
FIG. 7 illustrates the principle of attitude correction according to an exemplary embodiment.

FIGS. 5 to 7 show the principle of the correction. First, FIG. 5 shows the first detected attitude and a vector v1 indicating a gravity direction (estimated gravity direction) which is estimated based on the first detected attitude. FIG. 6 shows a vector G indicating a gravity direction (vertically-downward direction) which is calculated based on acceleration data detected by the acceleration sensor 39, and shows a second detected attitude which corresponds to the attitude of the game apparatus 10 when the gravity direction is assumed to be the vertically-downward direction as shown. That is, the second detected attitude can be considered to be an attitude that is determined based on the acceleration data. In the exemplary embodiment, as shown in FIG. 7, the first detected attitude is corrected so as to be approximate to the second detected attitude determined based on the acceleration data.

In the exemplary embodiment, the first detected attitude is corrected so as to be approximate to the second detected attitude; however, the first detected attitude having been corrected is not identical to the second detected attitude. This is in order to prevent, even when the acceleration data abruptly changes due to erroneous detection, rapid operation, and the like, the first detected attitude from abruptly changing after being corrected. Alternatively, in another embodiment, correction may be performed in such a manner that the first detected attitude having been corrected is identical to the second detected attitude. In the exemplary embodiment, as will be described below in detail, the degree of approximation of the first detected attitude to the second detected attitude is determined in such a manner that the degree of approximation changes based on the magnitude of the acceleration indicated by the acceleration data (more specifically, a difference between the magnitude of the acceleration and the magnitude of the gravitational acceleration). Alternatively, in another embodiment, the degree may be set to a predetermined fixed value.

Figure 8:
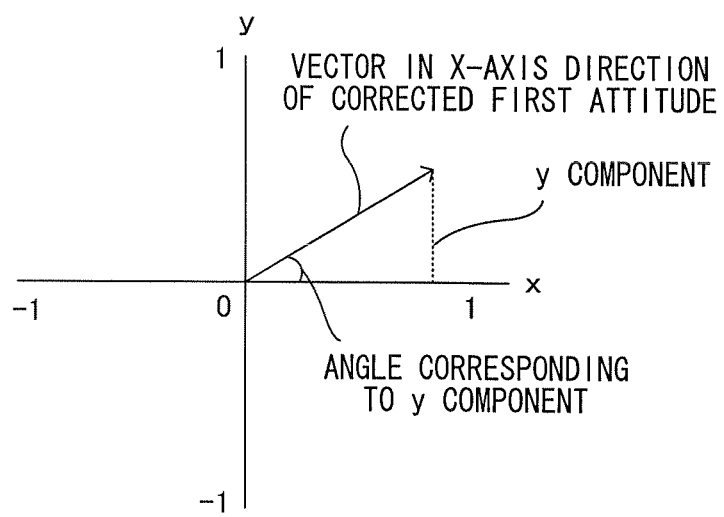
FIG. 8 illustrates the reflection of a change in attitude according to an exemplary embodiment.

In the exemplary embodiment, only the y component of the vector in the X-axis direction of the first detected attitude having been corrected as described above is reflected in a steering operation of a steering wheel (see FIG. 8). The y component may be considered to represent a position in the y-axis direction, or may be considered to represent an angle (angle corresponding to the y component) between the vector in the X-axis direction and the horizontal axis in FIG. 8. The reason why only the y component is used as described above, and the x component and the z component are not used, is as follows. In the correction process as described above, the attitude calculated by using the angular velocity data is corrected based on the gravity direction calculated by using the acceleration data. That is, the correction process utilizes the gravity direction which is a highly reliable reference. In addition, in each of the vectors in the X-axis, Y-axis, and Z-axis directions which vectors constitute the attitude of the game apparatus 10, the y component indicates a component along the gravity direction (in the real space). (To be accurate, the y component does not always indicate a component which is exactly along the gravity direction. In some cases, the direction of the component may slightly deviate from the gravity direction. That is, the y component may indicate a component which is substantially along the gravity direction.) Therefore, the y component in the corrected attitude, or the correction for the y component is very reliable. In the exemplary embodiment, since an operation system in which the player performs an operation as if to turn a steering wheel is used, the vector in the X-axis direction of the attitude of the game apparatus 10 is used. In addition, only the y component among the components of the vector in the X-axis direction is used, and is reflected as a steering angle of a steering wheel. In other words, a change of the attitude in the gravity direction (a direction which is substantially the gravity direction in some cases) is reflected in a steering operation. This enables a steering operation that is based on a component for which reliable correction has been performed, whereby operability that does not make a player feel the sense of incongruity can be provided in an operation using a change of attitude in the gravity direction, such as a steering operation of the player's car in a racing game or the like.

Figure 9:
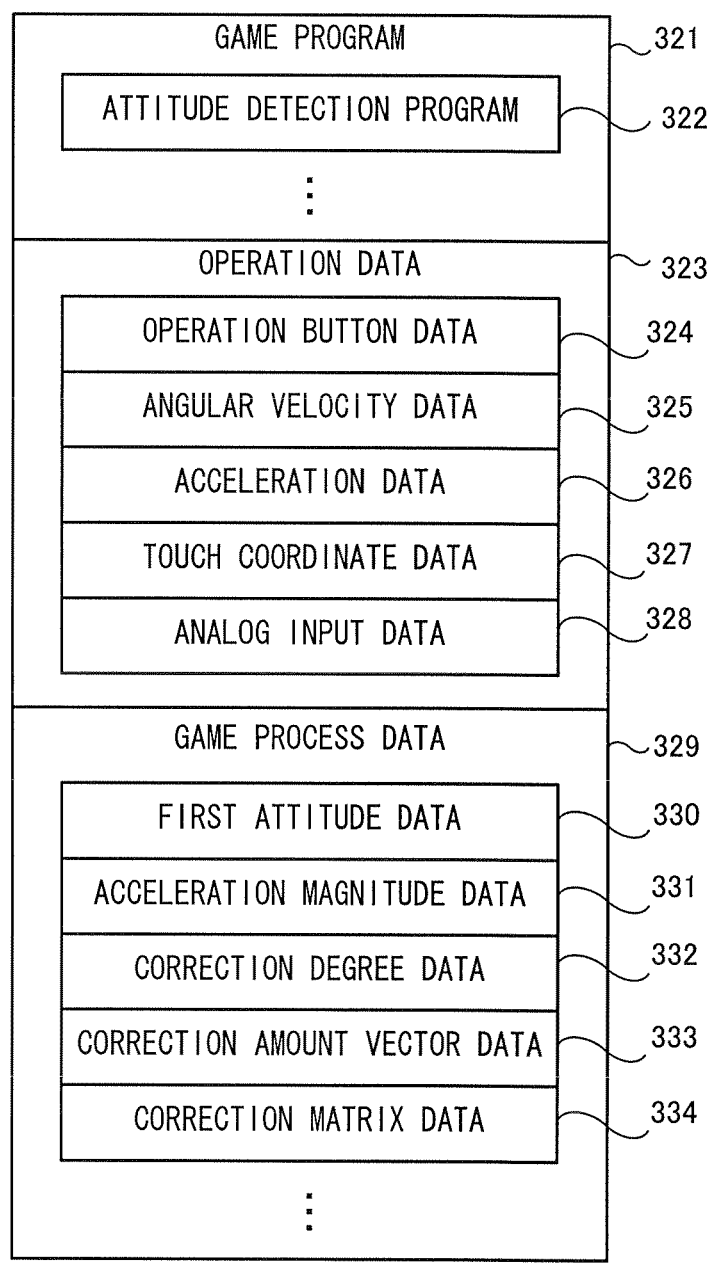
FIG. 9 shows major data stored in a main memory 32.

Next, a process executed on the game apparatus 10 will be described in detail. First, major data used in the process executed on the game apparatus 10 will be described with reference to FIG. 9. FIG. 9 shows the major data stored in the main memory 32 of the game apparatus 10. As shown in FIG. 9, a game program 321, operation data 323, and game process data 329 are stored in the main memory 32 of the game apparatus 10. In addition to the data shown in FIG. 9, data needed for the game process, such as image data for various objects appearing in the game and data indicating various parameters of the objects, are stored in the main memory 32.

At an appropriate timing after the game apparatus 10 is powered on, the game program 321 is partially or entirely loaded from the external memory 44 or the internal data storage memory 35, and stored in the main memory. The game program 321 includes an attitude detection program 322. The attitude detection program 322 is a program for executing the attitude detection process for detecting the attitude of the game apparatus 10.

The operation data 323 is data indicating the contents of an operation performed by the player on the game apparatus 10. The operation data 323 includes operation button data 324, angular velocity data 325, acceleration data 326, touch coordinate data 327, and analog input data 328. The operation button data 324 is data indicating whether the operation buttons 14 have been pressed. The angular velocity data 325 is data indicating angular velocities detected by the angular velocity sensor 47. In the exemplary embodiment, the angular velocity data 325 indicates angular velocities around the three axes, i.e., the X-axis, the Y-axis, and the Z-axis. Further, the acceleration data 326 is data indicating an acceleration (acceleration vector) detected by the acceleration sensor 39. In the exemplary embodiment, the acceleration data 326 indicates a three-dimensional acceleration vector Va1 consisting of components representing accelerations in the directions of the three axes, i.e., the X-axis, the Y-axis, and the Z-axis. Further, in the exemplary embodiment, the magnitude of the acceleration vector Va1 detected by the acceleration sensor 39 when the game apparatus 10 is in a static state is defined as "1". That is, the magnitude of the gravitational acceleration detected by the acceleration sensor 39 is "1". The touch coordinate data 327 is data indicating a touch coordinate detected by the touch panel 13. In addition, the analog input data 328 is data indicating whether an input operation has been performed via the analog stick 15.

The game process data 329 is used in the game process described below. The game process data 329 includes first attitude data 330, acceleration magnitude data 331, correction degree data 332, correction amount vector data 333, and correction matrix data 334. The game process data 329 includes various types of data (data indicating game parameters, for example) used in the game process, in addition to the data shown in FIG. 9.

The first attitude data 330 is data indicating the first detected attitude calculated by using the angular velocity data 325. In the exemplary embodiment, the first detected attitude is represented as the 3×3 matrix M1 shown in the above formula (1). Hereinafter, the matrix M1 representing the first detected attitude is referred to as a "first attitude matrix M1". In the exemplary embodiment, the first detected attitude is represented by means of the matrix. Alternatively, in another embodiment, the first detected attitude may be represented by a three-dimensional vector or three angles.

The acceleration magnitude data 331 is data indicating the magnitude (length) L of the acceleration vector Va1 indicated by the acceleration data 326.

The correction degree data 332 is data indicating the degree of correction (correction degree A) which is performed for the first detected attitude by using the second detected attitude. The correction degree A is a value within the range of $0 \leq A \leq C1$ (C1 is a predetermined constant within the range of $0 < C1 \leq 1$). As will be described below in detail, the greater the value of the correction degree A is, the more approximate the first detected attitude having been corrected is to the second detected attitude.

The correction amount vector data 333 is data indicating a vector representing an amount of correction by which the first detected attitude is corrected (hereinafter, referred to as a correction amount vector). A correction amount vector Vg is calculated based on the correction degree A and a vector Va2 which corresponds to the acceleration vector Va1 that is represented on the xyz-coordinate system.

The correction matrix data 334 is data indicating a rotation matrix (referred to as a correction matrix) Ma used for correcting the first detected attitude. That is, in a first correction process, the first attitude matrix M1 representing the first detected attitude is multiplied by the correction matrix Ma to correct the first detected attitude. The correction matrix Ma is calculated based on the vector Va2 and the correction amount vector Vg.

Figure 10:
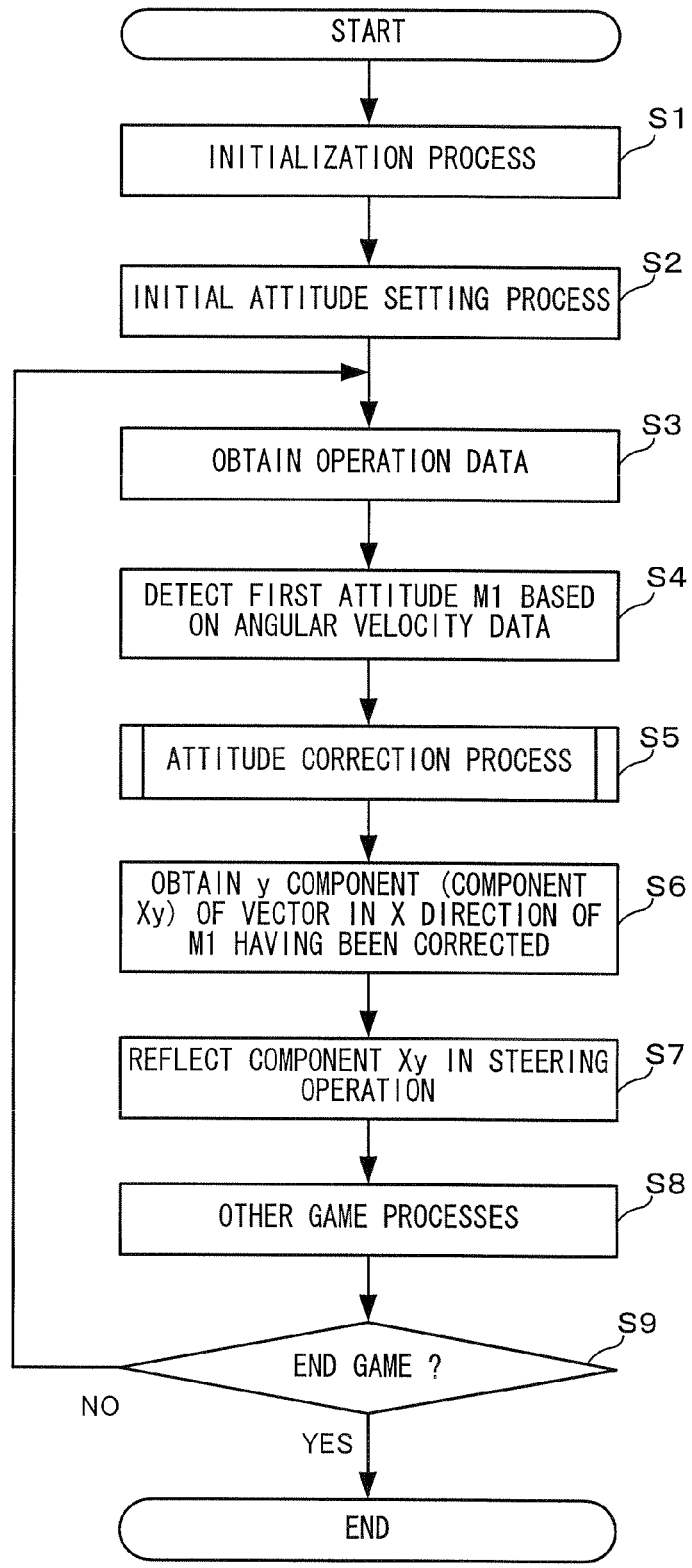
FIG. 10 is a flowchart showing a game process according to an exemplary embodiment.
Figure 11:
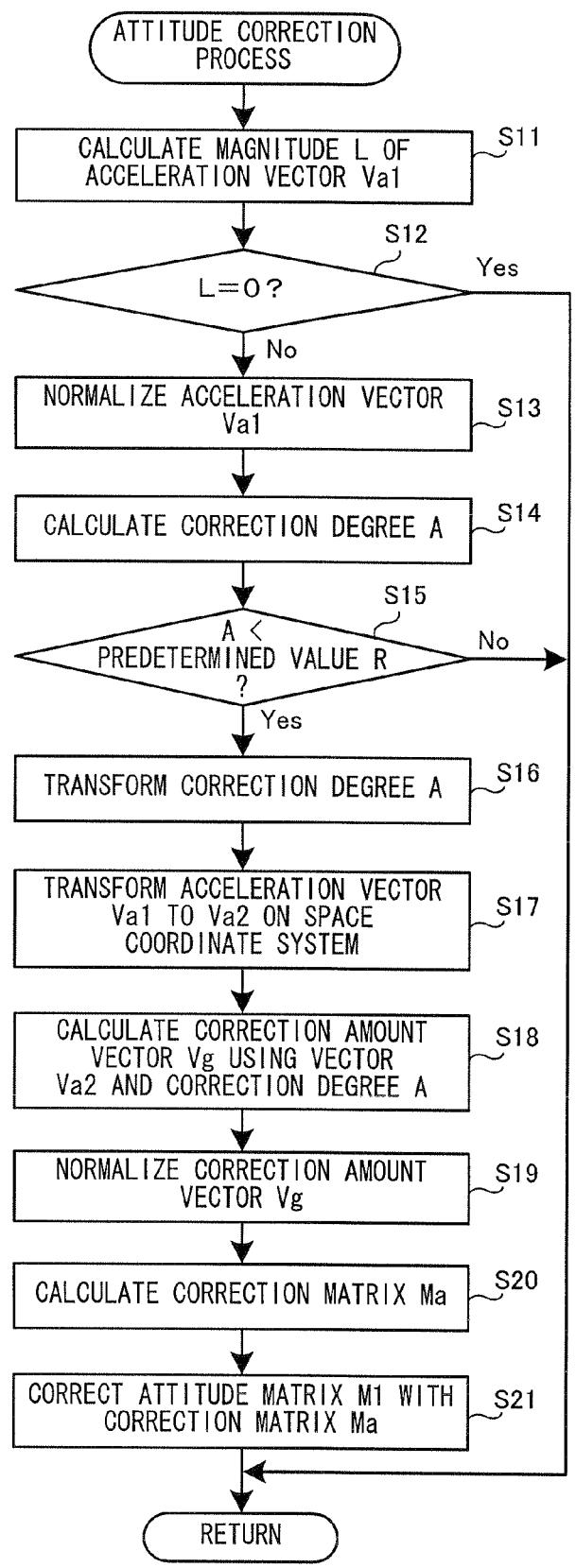
FIG. 11 is a flowchart showing in detail an attitude correction process at step S5 shown in FIG. 10.

Next, the process executed on the game apparatus 10 will be described in detail with reference to FIG. 10 and FIG. 11. FIG. 10 is a main flowchart showing the flow of the process executed on the game apparatus 10.

First, at step S1, the CPU 311 executes an initialization process for the game. In the initialization process, for example, values of various parameters used in the game process are initialized, a virtual game space is created, and the player object and other objects are located at initial positions in the game space. Subsequent to step S1 described above, a process at step S2 is executed.

At step S2, the CPU 311 executes an initial attitude setting process. Specifically, a predetermined value is set as an initial attitude which is the first detected attitude of the game apparatus 10 in the initial state, in response to a predetermined operation performed by the player. Here, an attitude as shown in FIG. 1, that is, an attitude in which the imaging direction of the outer imaging section is the Z-axis positive direction and the right side surface of the lower housing is directed to the X-axis positive direction (rightward direction), is defined as a reference attitude. Therefore, it is desired that the player performs the predetermined operation while he/she is holding the game apparatus 10 in such a manner that the initial attitude corresponds to the reference attitude. When the predetermined operation has been performed, the CPU 311 stores data indicating a matrix representing the initial attitude into the main memory as first attitude data. After step S2 described above, a process loop of steps S3 to S9 is repeatedly performed while the game is being played. One process loop is performed every one frame time (1/60 seconds, for example).

In the exemplary embodiment, the initial attitude setting process (step S2) is executed only once before the start of the game (before the process loop of steps S3 to S9 is performed). Alternatively, in another embodiment, the initial attitude setting process may be executed at any timing during the game. That is, the CPU 311 may execute the initial attitude setting process in response to the predetermined operation performed by the player during the game.

Next, at step S3, the CPU 311 obtains the operation data. Then, the angular velocity data, the acceleration data, the touch coordinate data, and the operation button data which are included in the operation data are stored into the main memory 32.

Next, at step S4, the CPU 311 detects the first detected attitude based on the angular velocity data 325 stored in the main memory 32. Any method may be used as a method for detecting the attitude of the game apparatus 10 based on angular velocities. In the exemplary embodiment, the first detected attitude is detected by using the immediately preceding first detected attitude (first detected attitude having been detected in the previous process loop) and current angular velocities (angular velocities obtained in the current process loop). Specifically, the CPU 311 determines, as the first detected attitude, an attitude obtained by rotating the immediately preceding first detected attitude by angles corresponding to the current angular velocities per unit time. The immediately preceding first detected attitude is indicated by the first attitude data 330 stored in the main memory 32, while the current angular velocities are indicated by the angular velocity data 325 stored in the main memory 32. Data indicating an attitude (3×3 matrix) calculated at step S4 is newly stored into the main memory 32 as the first attitude data 330.

Next, at step S5, an attitude correction process is executed. FIG. 11 is a flowchart showing the flow of the attitude correction process (step S5). In the attitude correction process, first, at step S11, the CPU 311 calculates the magnitude L of an acceleration detected by the acceleration sensor 39. That is, the CPU 311 reads the acceleration data 326 stored in the main memory 32, and calculates the magnitude L of the acceleration vector Va1 indicated by the acceleration data 326. Data indicating the calculated magnitude L is stored into the main memory 32 as the acceleration magnitude data 331. Subsequent to step S11, a process at step S12 is executed.

At step S12, the CPU 311 determines whether or not the magnitude of the acceleration detected by the acceleration sensor 39 is 0. That is, the CPU 311 reads the acceleration magnitude data 331 stored in the main memory 32, and determines whether or not the magnitude L indicated by the acceleration magnitude data 331 is 0. If the result of the determination at step S12 is negative, a process at step S13 is executed. On the other hand, if the result of the determination at step S12 is positive, subsequent steps S13 to S21 are skipped, and the CPU 311 ends the first correction process. As described above, in the exemplary embodiment, if the magnitude of an acceleration detected by the acceleration sensor 39 is 0, correction using the acceleration is not performed. This is because the gravity direction cannot be calculated based on the result of the detection by the acceleration sensor 39 in the case where the magnitude of the acceleration is 0, and because processes at subsequent steps S13 to S21 are difficult to execute in the case where the magnitude of the acceleration vector is 0.

At step S13, the CPU 311 normalizes the acceleration vector Va1 detected by the acceleration sensor 39. That is, the CPU 311 reads the acceleration data 326 stored in the main memory 32, and corrects the acceleration vector Va1 indicated by the acceleration data 326 in such a manner that the magnitude of the acceleration vector Va1 becomes 1. The CPU 311 stores data indicating the normalized acceleration vector Va1 into the main memory 32.

Next, at step S14, the CPU 311 calculates the correction degree A indicating the degree of correction which is performed for the first detected attitude in the first correction process. The correction degree A is calculated based on the magnitude L of the acceleration vector Va1 yet to be normalized. Specifically, the CPU 311 reads the acceleration magnitude data 331 stored in the main memory 32. Then, the CPU 311 calculates the correction degree A by using the magnitude L indicated by the acceleration magnitude data 331, in accordance with the following formula (2).

$$A = |L-1| \quad (2)$$

Data indicating the correction degree A calculated in accordance with the above formula (2) is stored into the main memory 32 as the correction degree data 332. The correction degree A calculated in accordance with the above formula (2) is not a final value, but a value for which additional calculation is performed. The value is transformed later at step S16 to obtain a final value of the correction degree A. Subsequent to step S14, a process at step S15 is executed.

Next, at step S15, the CPU 311 determines whether or not the correction degree A calculated at step S14 is smaller than a predetermined value R. The predetermined value R is previously determined, and set to, for example, 0.4. As described above, in the exemplary embodiment, the magnitude of the gravitational acceleration detected by the acceleration sensor 39 is "1", and the correction degree A is an absolute value (the above formula (2)) of the difference between the magnitude L of the acceleration vector Va1 and "1". Therefore, the case where the correction degree A is larger than or equal to the predetermined value R corresponds to the case where the difference between the magnitude of the acceleration vector Va1 and the magnitude of the gravitational acceleration is larger than or equal to the predetermined value R. If the result of the determination at step S15 is positive, a process at step S16 is executed. On the other hand, if the result of the determination at step S15 is negative, processes at steps S16 to S21 are skipped, and the CPU 311 ends the first correction process.

As described above, in the exemplary embodiment, correction is performed only when the difference between the magnitude L of the acceleration detected by the acceleration sensor 39 and the magnitude of the gravitational acceleration (=1) is smaller than the predetermined reference value (predetermined value R), and if the difference between the magnitude L and the magnitude of the gravitational acceleration is larger than or equal to the predetermined reference value, correction is not performed. Here, when the game apparatus 10 is being moved, the magnitude L of the acceleration vector Va1 to be detected is a value different from "1" because not only the gravitational acceleration but also an acceleration due to inertia caused by the movement of the game apparatus 10 are detected by the acceleration sensor 39. In addition, when the game apparatus 10 is being vigorously moved, the magnitude L is a value greatly different from "1". Therefore, if the difference between the magnitude L and the magnitude of the gravitational acceleration is larger than or equal to the predetermined reference value, it can be assumed that the game apparatus 10 is being vigorously moved. Further, if the game apparatus 10 is being vigorously moved, it can be assumed that because many components (components of the acceleration due to inertia described above) other than the gravitational acceleration are contained in the acceleration vector Va1 detected by the acceleration sensor 39, the value of the acceleration vector Va1 is not reliable as a value indicating the gravity direction. Accordingly, the determination process at step S15 described above is a process of determining whether or not the game apparatus 10 is being vigorously moved, that is, whether or not the value of the acceleration vector Va1 is reliable as a value indicating the gravity direction (vertical direction). In the exemplary embodiment, correction is not performed when it is determined by the determination process at step S15 described above that the value of the acceleration vector Va1 is not reliable as a value indicating the gravity direction, and correction is performed only when it is determined by the determination process at step S15 that the value of the acceleration vector Va1 is reliable as a value indicating the gravity direction. This can prevent the first detected attitude from being erroneously corrected as a result of correction that has been performed by using an acceleration vector Va1 that is not reliable as a value indicating the gravity direction.

At step S16, the CPU 311 transforms the value of the correction degree A. In the exemplary embodiment, the correction degree A is transformed in such a manner that the more approximate the magnitude L of the detected acceleration vector Va1 is to the magnitude of the gravitational acceleration, the more approximate the correction degree A is to 1. Specifically, the CPU 311 reads the correction degree data 332 stored in the main memory 32, and transforms the correction degree A indicated by the correction degree data 332 in accordance with the following formulae (3) to (5).

$$A2 = 1-(A1/R) \quad (3)$$

$$A3 = A2 \times A2 \quad (4)$$

$$A4 = A3 \times C1 \quad (5)$$

In the above formulae (3) to (5), the variable A1 is a correction degree before transformation (a value indicated by the correction degree data 332 that is currently stored in the main memory 32), and the variable A4 is a correction degree that is finally obtained by transformations at step S16. The above formula (3) is a formula for obtaining the correction degree A2 in such a manner that the more approximate the magnitude of the correction degree A1 before transformation is to the magnitude of the gravitational acceleration (=1), the more approximate the correction degree A2 after transformation is to 1. The above formula (4) is a formula for obtaining the correction degree A3 in such a manner that the more approximate the correction degree A2 before transformation is to 1, the more heavily the correction degree 3 is weighted. The above formula (5) is a formula for adjusting the magnitude of the correction amount. That is, the larger the value of the constant C1 is, the larger the correction amount becomes. The constant C1 is previously determined, and is set to be within the range of 0<C1≤1 (for example, 0.03). Data indicating the correction degree A4 obtained by transformations in accordance with the above formulae (3) to (5) is stored into the main memory as new correction degree data 332. Subsequent to step S16 described above, a process at step S17 is executed.

In the exemplary embodiment, transformations are performed in accordance with the above formulae (3) to (5).

Alternatively, in another embodiment, a part or all of the transformations in accordance with the above formulae (3) to (5) may be omitted. However, in the case where the transformation in accordance with the above formula (3) is omitted, it is necessary to replace the acceleration vector Va2 and the gravity direction vector (0, −1, 0) with each other in the formula (7) used at step S18 described below.

At step S17, the CPU 311 transforms the acceleration vector Va1 represented on the XYZ-coordinate system to Va2 which is a value on the xyz-coordinate system. The acceleration vector Va2 on the xyz-coordinate system is calculated by transforming the normalized acceleration vector Va1 by means of the first attitude matrix M1 representing the first detected attitude that has been obtained in the previous frame. That is, the CPU 311 reads the first attitude data 330 and the data for the (normalized) acceleration vector Va1 which has been stored into the main memory at step 13. Then, the CPU 311 calculates the acceleration vector Va2 on the xyz-coordinate system by using the acceleration vector Va1 and the first attitude matrix M1 indicated by the first attitude data 330. More specifically, when the normalized acceleration vector Va1 is defined as (nx, ny, nz), the elements of the first attitude matrix M1 are defined as variables shown in the above formula (1), and the acceleration vector Va2 represented on the xyz-coordinate system is defined as (vx, vy, vz), the acceleration vector Va2 can be calculated in accordance with the following formula (6).

$$vx = Xx \times nx + Yx \times ny + Zx \times nz$$

$$vy = Xy \times nx + Yy \times ny + Zy \times nz$$

$$vz = Xz \times nx + Yz \times ny + Zz \times nz \quad (6)$$

As represented by the above formula (6), the acceleration vector Va1 is rotated by means of the first attitude matrix M1 which is a rotation matrix, whereby the acceleration vector Va2 can be obtained. The acceleration vector Va2 calculated at step S17 is stored into the main memory. Subsequent to step S17 described above, a process at step S18 is executed.

At step S18, the CPU 311 calculates the correction amount vector Vg by using the acceleration vector Va2 represented on the xyz-coordinate system and the correction degree A. The correction amount vector Vg is calculated by using the correction degree obtained as a result of the transformations at step S16 described above, and a vector (0, −1, 0) indicating the vertically-downward direction (gravity direction) on the xyz-coordinate system. Specifically, the CPU 311 reads the correction degree data 332 stored in the main memory 32, and calculates the correction amount vector Vg=(gx, gy, gz) by using the correction degree A indicated by the correction degree data 332, in accordance with the following formula (7).

$$gx = (0 - vx) \times A + vx$$

$$gy = (-1 - vy) \times A + vy$$

$$gz = (0 - vz) \times A + vz \quad (7)$$

As represented by the above formula (7), the correction amount vector Vg is a vector whose end point corresponds to a point that internally divides, at a ratio of A to (1-A), a line segment extending from the end point of the acceleration vector Va2 to the end point of the gravity direction vector (0, −1, 0). Therefore, the larger the value of the correction degree A is, the more approximate the correction amount vector Vg is to the gravity direction vector. The CPU 311 stores data indicating the correction amount vector Vg calculated in accordance with the above formula (7) into the main memory as the correction amount vector data 333. Subsequent to step S18 described above, a process at step S19 is executed.

At step S19, the CPU 311 normalizes the correction amount vector Vg calculated at step S18 described above. That is, the CPU 311 reads the correction amount vector data 333 stored in the main memory, and normalizes the vector indicated by the correction amount vector data 333. Then, the CPU 311 stores data indicating the normalized vector into the main memory as new correction amount vector data 333. Subsequent to step S19 described above, a process at step S20 is executed.

At step S20, the CPU 311 calculates the correction matrix Ma for correcting the first detected attitude. The correction matrix Ma is calculated based on the acceleration vector Va2 represented on the xyz-coordinate system and the correction amount vector Vg normalized at step S19. Specifically, the CPU 311 reads the acceleration vector Va2 stored into the main memory at step S17, and the correction amount vector data 333. Then, the CPU calculates a rotation matrix for rotating the acceleration vector Va2 to cause the acceleration vector Va2 to coincide with the correction amount vector Vg, and defines the calculated rotation matrix as the correction matrix Ma. Data indicating the correction matrix Ma calculated at step S20 is stored into the main memory as the correction matrix data 334.

Next, at step S21, the CPU 311 corrects the first attitude matrix M1 representing the first detected attitude by means of the correction matrix Ma. Specifically, the CPU 311 reads the first attitude data 330 and the correction matrix data 334 which are stored in the main memory 32. Then, the CPU 311 transforms the first attitude matrix M1 indicated by the first attitude data 330 by means of the correction matrix Ma indicated by the correction matrix data 334 (i.e., calculates the product of the first attitude matrix M1 and the correction matrix Ma). The first attitude matrix M1 having been transformed represents the first detected attitude having been corrected. That is, the process at step S21 corresponds to the process as shown in FIG. 7, i.e., the process of rotating the first detected attitude in such a manner that the first detected attitude approximates to the second detected attitude. The CPU 311 stores data indicating the first attitude matrix M1 having been corrected (transformed) into the main memory as new first attitude data 330. After step S21 described above, the CPU 311 ends the attitude correction process.

Referring to FIG. 10 again, at step S6, the CPU 311 subsequently obtains the y component of the vector in the X-axis direction (component Xy in the formula 1) from the first attitude data 330 after the above correction.

Next, at step S7, the CPU 311 executes a process of reflecting the obtained component Xy in a steering angle of a steering wheel (a process of determining the steering angle). That is, the value indicated as the component Xy is reflected in the steering operation.

Next, at step S8, the CPU 311 executes other various game processes. That is, various game processes, such as a process of moving the player object 101 based on the steering angle of the steering wheel and a process of moving other objects, are executed. Further, an image, taken by a virtual camera, of a virtual space in which the game processes have been reflected is rendered as a game screen.

Next, at step S9, the CPU 311 determines whether or not to end the game. For example, the determination at step S9 is performed based on whether the game has been cleared, whether conditions for the game over have been satisfied, or whether the player has given an instruction to discontinue the game. If the result of the determination at step S9 is negative, the process at step S3 is executed again. Thereafter, the process loop of steps S3 to S9 is repeatedly performed until it is determined at step Sx that the game should be ended. On the other hand, if the result of the determination at step S9 is positive, the CPU 311 ends the game process shown in FIG. 10. This is the end of the description of the game process.

As described above, in the exemplary embodiment, the attitude of the game apparatus 10 calculated by using the angular velocity data is corrected by using the acceleration data, and only the y component of the vector in the X-axis direction of the corrected attitude is reflected in the steering operation (the steering angle of the steering wheel). That is, a change of the attitude along the gravity direction is reflected in the steering operation. Thus, a change of the attitude of the game apparatus 10 due to an operation performed by the player can be reflected in the game process by using only a component which is based on the gravity direction and thus can be corrected with high reliability. Therefore, it is possible to realize movements of the player object and the like that are less incongruous with the contents of an operation performed by the player. In other words, by using only the y component in the corrected attitude, it is possible to execute various types of information processing, such as a game process that makes the best use of the advantages of both an angular velocity sensor and an acceleration sensor.

In the above embodiment, a steering operation in a racing game is taken as an example. Since the steering operation is performed in a planar manner (that is, only a tilt in the rightward/leftward direction has to be detected), only the vector in the X-axis direction of the attitude of the game apparatus 10 is used. However, the exemplary embodiments are not limited thereto. For example, a vector in the direction of another axis may be additionally used in combination with the vector in the X-axis direction of the attitude of the game apparatus 10. For example, in the case where the player is caused to perform an operation as if to operate an operating rod, the vector in the X-axis direction and the vector in the Z-axis direction may be used. Also in such a case, the y component of each vector may be used for executing the game process. This is because any of the y components of the vectors is along the gravity direction, and thus is considered to be corrected with high reliability. That is, in any kind of operation that causes a change along the gravity direction, a change in the y component (axis direction along the gravity direction) can be detected with high accuracy, and can be reflected in the contents of the operation.

In the above embodiment, an example has been described in which the y component of the vector in the X-axis direction of the corrected attitude is used for the steering operation. Alternatively, an angle (an angle corresponding to the y component shown in FIG. 8) between the vector in the X-axis direction of the first detected attitude having been corrected and the vector perpendicular to the vertical direction may be calculated, and the angle may be reflected in the steering angle of the steering wheel.

In the above embodiment, a hand-held game apparatus including two display devices has been described as an example. However, another embodiment may be implemented as a mobile terminal including a single display device and a housing in which an acceleration sensor and an angular velocity sensor are included.

In the above embodiment, the case where a three-dimensional attitude is detected by means of an angular velocity sensor for detecting angular velocities around three axes has been described as an example. However, the exemplary embodiments are also applicable to the case where an attitude (rotation angle) on a two-dimensional plane is calculated.

In the above embodiment, the case has been described where a single apparatus (game apparatus 10) executes a series of processes for reflecting the attitude of the game apparatus 10 in the steering operation. Alternatively, in another embodiment, the series of processes may be executed on an information processing system including a plurality of information processing apparatuses. For example, in an information processing system including a terminal side apparatus and a server side apparatus communicable with the terminal side apparatus via a network, a part of the series of processes may be executed by the server side apparatus. Alternatively, in an information processing system including a terminal side apparatus and a server side apparatus communicable with the terminal side apparatus via a network, a main process of the series of processes may be executed by the server side apparatus, and a part of the series of processes may be executed by the terminal side apparatus. Still alternatively, in the information processing system, a server side system may include a plurality of information processing apparatuses, and a process to be performed in the server side system may be divided and executed by the plurality of information processing apparatuses.

What is claimed is:

1. An input device including an angular velocity sensor and an acceleration sensor, the input device comprising at least one processor configured to at least:
    calculate a first attitude of the input device, based on angular velocity data outputted from the angular velocity sensor;
    compare a first magnitude, corresponding to an acceleration calculated based on acceleration data outputted by the acceleration sensor, to a second magnitude, corresponding to acceleration of gravity;
    correct the first attitude in accordance with a difference between the first magnitude and the second magnitude if the difference is smaller than a reference difference amount; and
    execute predetermined information processing to move, using a component of the corrected first attitude corresponding to a direction associated with gravity, but not using components of the corrected first attitude corresponding to directions perpendicular to the direction associated with gravity, an object in a virtual space displayed on a display screen associated with the input device.

2. The input device according to claim 1, wherein an attitude of the input device in a static state is identified as a second attitude based on an acceleration indicated by the acceleration data, and the first attitude is corrected such that the first attitude approximates to the second attitude.

3. The input device according to claim 2, wherein the second attitude is defined when a direction of the acceleration indicated by the acceleration data is in a vertically-downward direction.

4. The input device according to claim 2, wherein an approximation of the first attitude to the second attitude is changed based on the difference between the first magnitude and the second magnitude.

5. The input device according to claim 2, wherein an approximation of the first attitude to the second attitude is set to a predetermined fixed value.

6. The input device according to claim 3, wherein the first attitude is set approximate to the second attitude such that the closer the first magnitude is to the second magnitude, the closer the first attitude is set to the second attitude.

7. The input device according to claim 1, further comprising the display screen in an integrated manner.

8. The input device according to claim 1, wherein an attitude of the input device in a static state is identified as a second attitude based on an acceleration indicated by the acceleration data, and the first attitude is set to the second attitude.

9. The input device according to claim 1, wherein the object is a player object and the virtual space is a virtual game world.

10. A non-transitory computer-readable storage medium having stored therein an input processing program executed by a computer of an information processing apparatus including an angular velocity sensor and an acceleration sensor, the input processing program, when executed, causing the computer to perform operations comprising:
   calculating a first attitude of the input device, based on angular velocity data outputted from the angular velocity sensor;
   comparing a first magnitude, corresponding to an acceleration calculated based on acceleration data outputted by the acceleration sensor, to a second magnitude, corresponding to acceleration of gravity;
   correcting the first attitude in accordance with a difference between the first magnitude and the second magnitude if the difference is smaller than a reference difference amount;
   executing predetermined information processing to move, using a component of the corrected first attitude corresponding to a direction associated with gravity, but not using components of the corrected first attitude corresponding to directions perpendicular to the direction associated with gravity, an object in a virtual space; and
   generating images of the virtual space for display on a display coupled to the information processing apparatus.

11. The non-transitory computer-readable storage medium of claim 10, wherein an attitude of the input device in a static state is identified as a second attitude, based on an acceleration indicated by the acceleration data, and the first attitude is corrected such that the first attitude approximates to the second attitude.

12. The non-transitory computer-readable storage medium of claim 11, wherein an approximation of the first attitude to the second attitude is changed based on the difference between the first magnitude and the second magnitude.

13. The non-transitory computer-readable storage medium of claim 11 wherein an approximation of the first attitude to the second attitude is set to a predetermined fixed value.

14. An input processing method used in an information processing apparatus including an angular velocity sensor and an acceleration sensor, the input processing method comprising the steps of:
   calculating, using a computer, a first attitude of an input device, based on angular velocity data outputted from the angular velocity sensor;
   comparing, using the computer, a first magnitude, corresponding to an acceleration calculated based on acceleration data outputted by the acceleration sensor, to a second magnitude, corresponding to acceleration of gravity;
   correcting, using the computer, the first attitude in accordance with a difference between the first magnitude and the second magnitude if the difference is smaller than a reference difference amount; and
   executing, using the computer, predetermined information processing to move, using a component of the corrected first attitude corresponding to a direction associated with gravity, but not using components of the corrected first attitude corresponding to directions perpendicular to the direction associated with gravity, an object in a virtual space displayed on a display coupled to the information processing apparatus.

15. The non-transitory computer-readable storage medium of claim 10, wherein an attitude of the input device in a static state is identified as a second attitude based on an acceleration indicated by the acceleration data, and the first attitude is set to the second attitude.

16. An input processing system comprising:
   an angular velocity sensor for outputting angular velocity data associated with attitude of an input device;
   an acceleration sensor for outputting acceleration data; and
   at least one processor being configured to at least:
      calculate an attitude of the input device based on the angular velocity data outputted from the angular velocity sensor;
      compare a first magnitude, corresponding to an acceleration calculated based on the acceleration data, to a second magnitude, corresponding to acceleration of gravity;
      correct the calculated attitude in accordance with a difference between the first magnitude and the second magnitude if the difference is smaller than a reference difference amount,
      execute predetermined information processing to move, using a component of the corrected attitude corresponding to a direction associated with gravity, but not using components of the corrected attitude corresponding to directions perpendicular to the direction associated with gravity, an object in a virtual space; and
      generate images of the virtual space for display on a display coupled to the information processing apparatus.

17. The input processing system according to claim 16, wherein the object is a player object and the virtual space is a virtual game world.

18. The input processing system according to claim 16, wherein the at least one processor is further configured to execute an application, and wherein:
   the predetermined information processing controls movement of the object in the application.

19. A system comprising:
   an input device comprising an angular velocity sensor and an acceleration sensor, the angular velocity sensor for outputting angular velocity data associated with attitude of the input device and the acceleration sensor for outputting acceleration data;
   a display; and
   a processing system including at least one processor coupled to the display, the processing system being configured to at least:
      receive the angular velocity data and the acceleration data from the angular velocity sensor and the acceleration sensor, respectively;
      calculate aspects of an attitude of the input device based on the angular velocity data of the input device;
      compare a first magnitude corresponding to an acceleration calculated based on the acceleration data to a second magnitude corresponding to acceleration of gravity;
      correct the calculated aspects of the attitude of the input device in accordance with a difference between the first magnitude and the second magnitude if the difference is smaller than a reference difference amount;
      execute predetermined information processing involving attitude of the input device to move an object in a virtual space in accordance with a corrected aspect of the attitude corresponding to a direction associated with gravity, but not using corrected aspects of the attitude corresponding to directions perpendicular to the direction associated with gravity; and display, on the display, the movement of the object in the virtual space.

20. The system of claim 19, wherein the predetermined information processing is executed based on changes in the calculated attitude in the direction associated with gravity.

21. The system of claim 19, wherein the calculated aspects of the attitude is corrected by setting the calculated attitude closer to a static attitude based on the difference between the first magnitude and the second magnitude, wherein the static attitude represents an attitude of the input device when the input device is in a static state.

22. The system of claim 19, wherein the movement of the object in the virtual space captured by a virtual camera disposed in the virtual space is displayed on the display.

23. A system comprising:
an input device comprising an angular velocity sensor and an acceleration sensor, the angular velocity sensor for outputting angular velocity data associated with attitude of the input device and the acceleration sensor for outputting acceleration data;
a display; and
a processing system including at least one processor coupled to the display, the processing system being configured to at least:
receive the angular velocity data and the acceleration data from the angular velocity sensor and the acceleration sensor respectively;
calculate aspects of an attitude of the input device based on the angular velocity data of the input device;
compare a first magnitude corresponding to an acceleration calculated based on the acceleration data to a second magnitude corresponding to acceleration of gravity;
correct the calculated aspects of the attitude of the input device in accordance with a difference between the first magnitude and the second magnitude if the difference is smaller than a reference difference amounts;
generate a virtual game world including a player object;
execute predetermined information processing to move the player object in the virtual game world based on the attitude of the input device using a corrected aspect of the attitude corresponding to a direction associated with gravity, but not using corrected aspects of the attitude corresponding to directions perpendicular to the direction associated with gravity; and
generate images of the virtual game world for display on the display.

* * * * *